Figure 1:
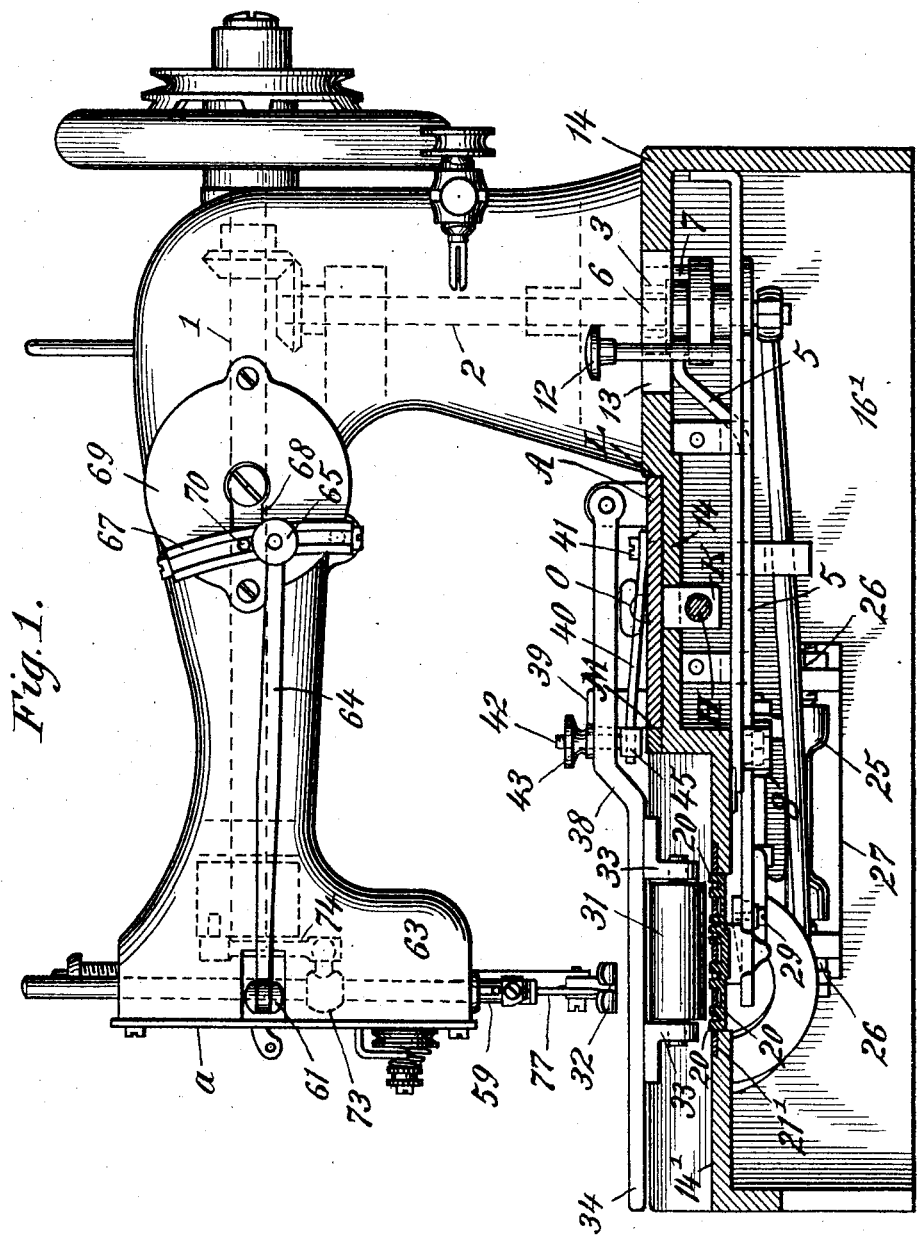

No. 774,723. PATENTED NOV. 8, 1904.
C. F. FILOR.
SEWING MACHINE FOR BLINDSTITCHING.
APPLICATION FILED JAN. 17, 1903.
NO MODEL. 10 SHEETS—SHEET 1.

WITNESSES:

INVENTOR
CHARLES F. FILOR
BY
Edward P. Thompson
ATTORNEY

No. 774,723. PATENTED NOV. 8, 1904.
C. F. FILOR.
SEWING MACHINE FOR BLINDSTITCHING.
APPLICATION FILED JAN. 17, 1903.
NO MODEL. 10 SHEETS—SHEET 3.

WITNESSES: Edward Rowland, Anna R. McCole

INVENTOR
CHARLES F. FILOR.
BY Edward P. Thompson
ATTORNEY

No. 774,723. PATENTED NOV. 8, 1904.
C. F. FILOR.
SEWING MACHINE FOR BLINDSTITCHING.
APPLICATION FILED JAN. 17, 1903.
NO MODEL. 10 SHEETS—SHEET 5.

WITNESSES: INVENTOR
CHARLES F. FILOR.
BY
Edward P. Thompson
ATTORNEY

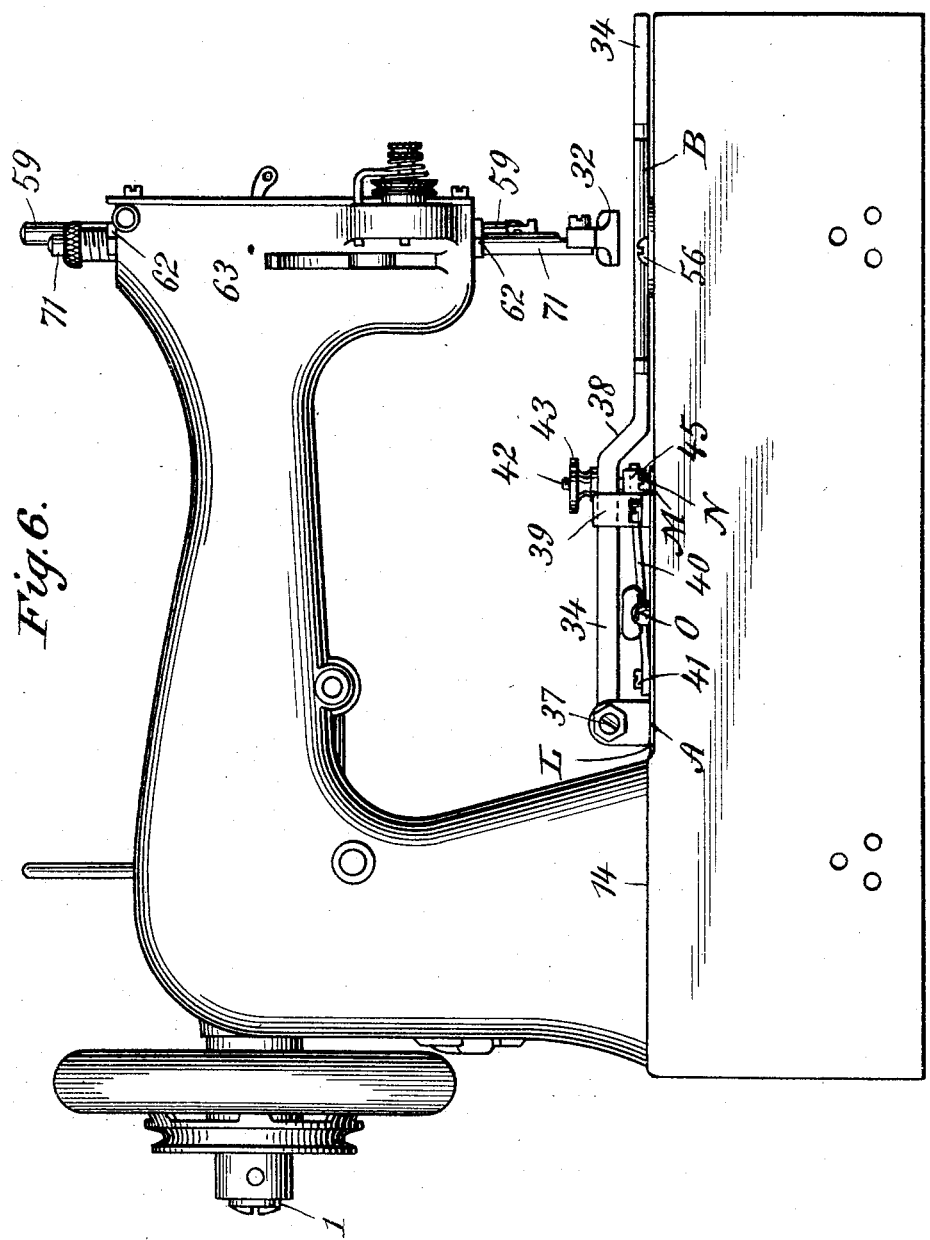

No. 774,723. PATENTED NOV. 8, 1904.
C. F. FILOR.
SEWING MACHINE FOR BLINDSTITCHING.
APPLICATION FILED JAN. 17, 1903.
NO MODEL. 10 SHEETS—SHEET 7.
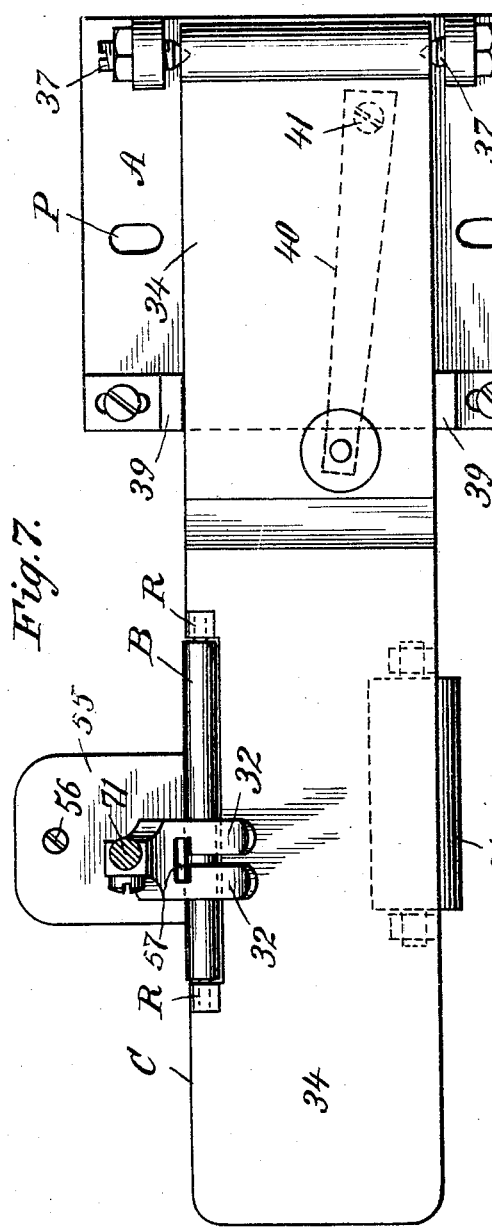
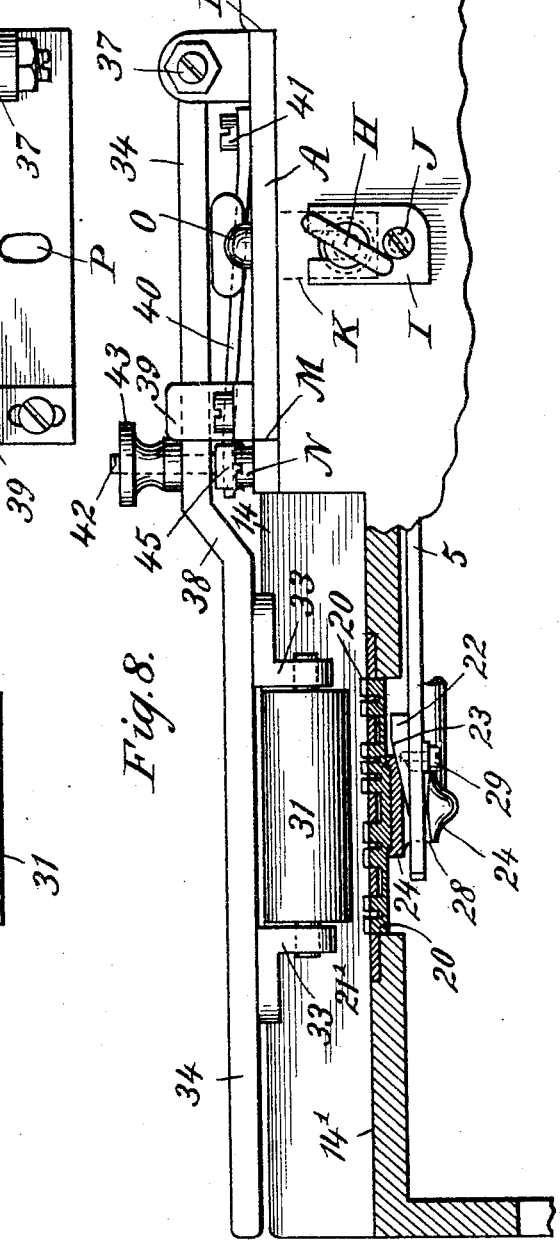
WITNESSES:
Donn Twitchell
Anna R. McCole
INVENTOR
CHARLES F. FILOR.
BY
Edward P. Thompson
ATTORNEY No. 774,723. PATENTED NOV. 8, 1904.
C. F. FILOR.
SEWING MACHINE FOR BLINDSTITCHING.
APPLICATION FILED JAN. 17, 1903.
NO MODEL. 10 SHEETS—SHEET 8.
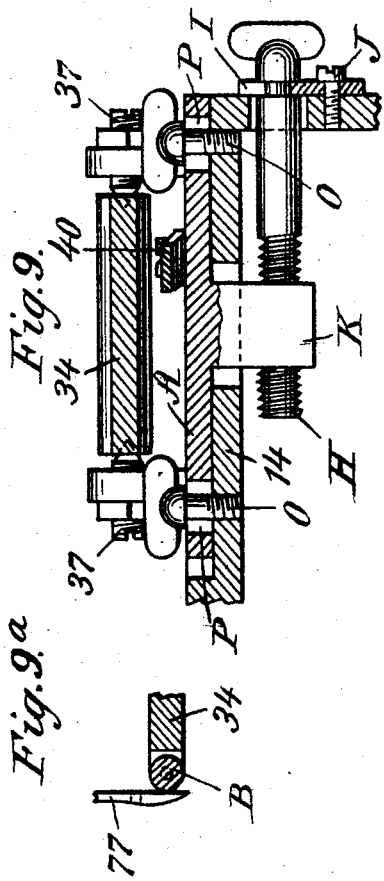
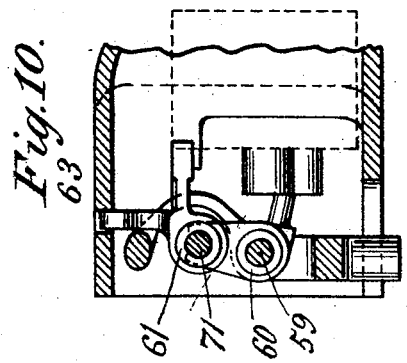
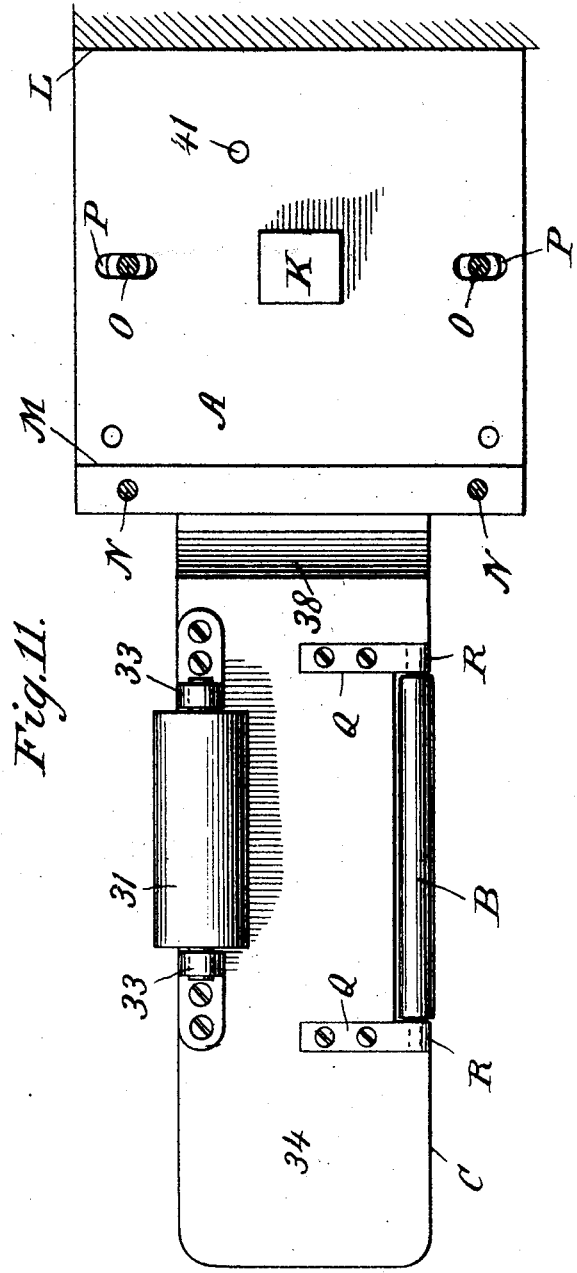
INVENTOR
CHARLES F. FILOR.
BY
Edward P. Thompson
ATTORNEY

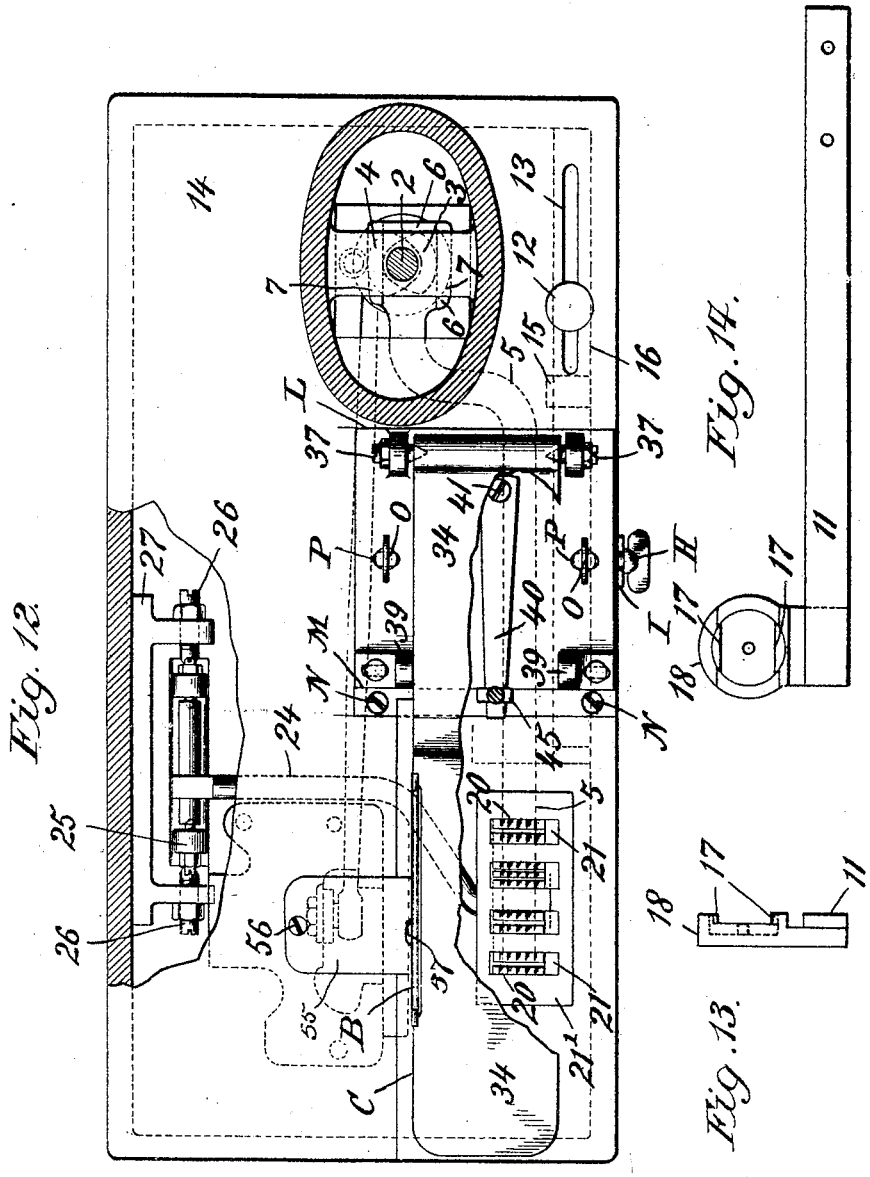

No. 774,723. PATENTED NOV. 8, 1904.
C. F. FILOR.
SEWING MACHINE FOR BLINDSTITCHING.
APPLICATION FILED JAN. 17, 1903.
NO MODEL. 10 SHEETS—SHEET 10.
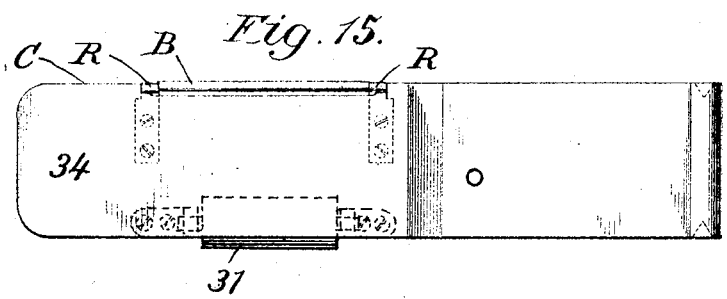
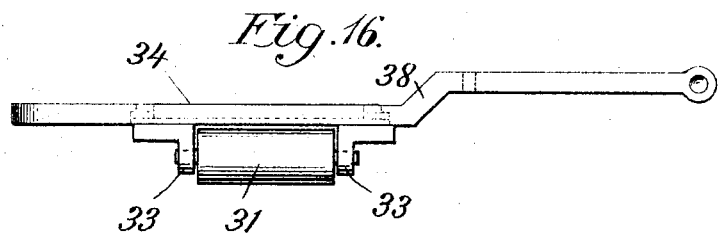
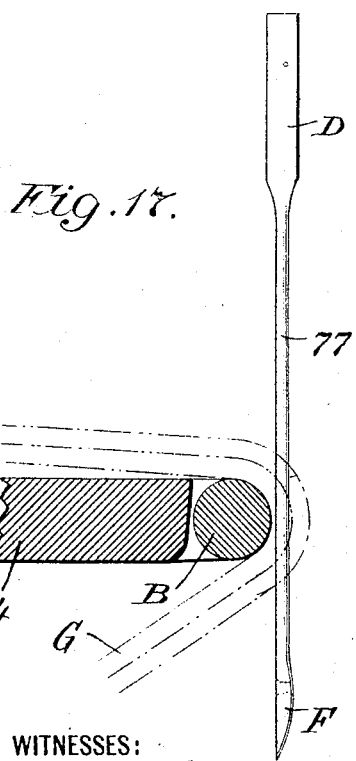
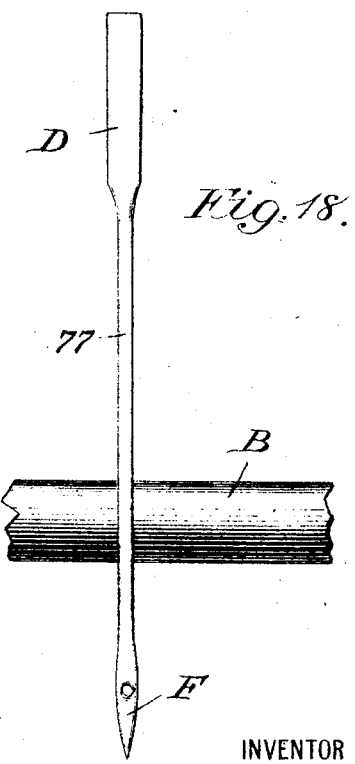
WITNESSES:
Edward Rowland
Anna R. McCole
INVENTOR
CHARLES F. FILOR.
BY
Edward P. Thompson
ATTORNEY No. 774,723.

Patented November 8, 1904.

UNITED STATES PATENT OFFICE.

CHARLES FRANCIS FILOR, OF TRENTON, NEW JERSEY, ASSIGNOR TO THE PERFECTION BLIND AND LOCK STITCH SEWING MACHINE COMPANY, OF TRENTON, NEW JERSEY, A CORPORATION OF NEW JERSEY.

SEWING-MACHINE FOR BLINDSTITCHING.

SPECIFICATION forming part of Letters Patent No. 774,723, dated November 8, 1904.

Application filed January 17, 1903. Serial No. 139,455. (No model.)

*To all whom it may concern:*

Be it known that I, CHARLES FRANCIS FILOR, a citizen of the United States of America, and a resident of Trenton, in the county of Mercer and State of New Jersey, have invented certain new and useful Improvements in Sewing-Machines for Blindstitching, of which the following is a specification.

The object of my invention is to provide a blindstitching sewing-machine that shall be adapted to quick adjustment and to substantially perfect accuracy of action in the performance of its functions. I have so improved machines of this class that the one herein described is as readily fitted for blindstitching as an ordinary machine is for ordinary stitching. By the mere manipulation of a few thumb-screws blindstitching upon different materials of different thickness and with different degrees of zigzag of the stitches may be effected.

The organization comprising the invention consists of a needle, a constantly-reciprocating work-carrying lever, and a fulcrum therefor, said lever and said fulcrum being jointly movable laterally to and from the needle.

More specifically, the machine consists of the combination of a work-carrier having a folding edge about which the material to be worked upon may be folded, a needle contiguous to and reciprocating transversely to said carrier and provided with a grooved straight surface which faces said edge and extends from the point of the needle upward beyond the eye thereof, a feed-dog, a second roller larger than the first parallel thereto attached to said carrier and adapted to press toward said feed-dog, bearings for said second roller attached to the under side of said carrier, a bed-plate for the machine, a support for said carrier, means for moving said support, together with the carrier, so that the latter may be located at different distances laterally from said needle, said carrier consisting of a lever pivoted and guided relatively to said support, manual devices for rigidly fixing said support to said bed-plate at any of its various positions, said means consisting of a thumb-screw having its bearings connected to the bed-plate and its traveling nut attached to said support, said bed-plate having a depression with guiding-surfaces for receiving, holding, and guiding said support, a fulcrum for said lever, consisting of pivots extending upward from said support and carried thereby, the guides for said lever being carried by said support, a spring action between said lever and said support, and the manual devices for fixing the support, consisting of screws passing through slotted holes in said support and extending into threaded holes in said bed-plate, said pivots consisting of a pair of center screws, said bed-plate having a second depression under said lever, the under surface of the lever being in about the same plane as the main top surface of said bed-plate.

One of the leading features consists in the combination existing between the roller over which the cloth passes and a needle which is flattened from the point upward along the length thereof and provided with a groove for the thread to lie in.

The above definitions are not necessarily for the purpose of formulating the legal scope of the invention, as this is attended to in the claims. The above explanations will, however, serve as a statement of the nature of the invention before referring to the exact details as set forth in the drawings, which will now be described.

Figure 2:
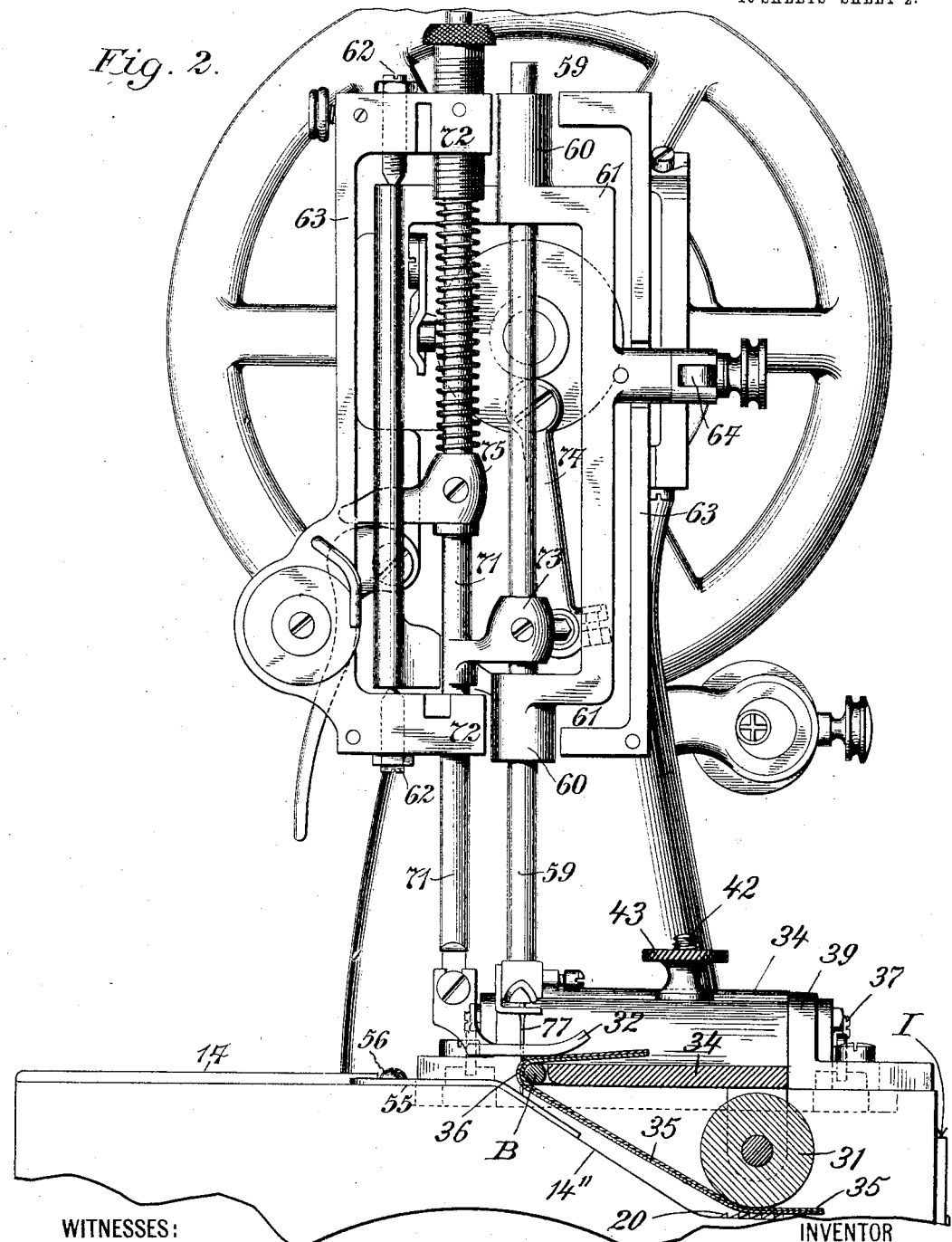
Figure 3:
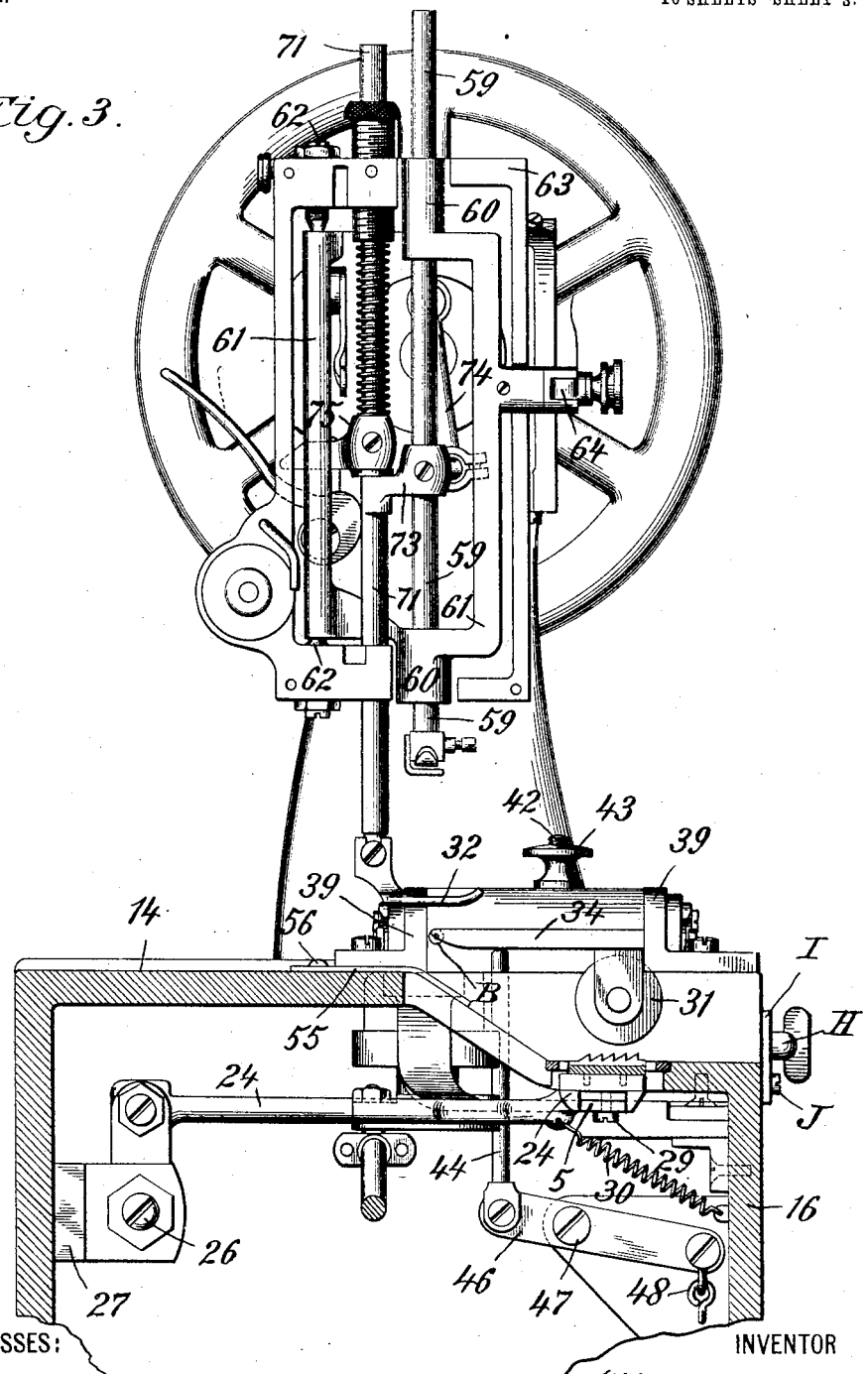
Figure 4:
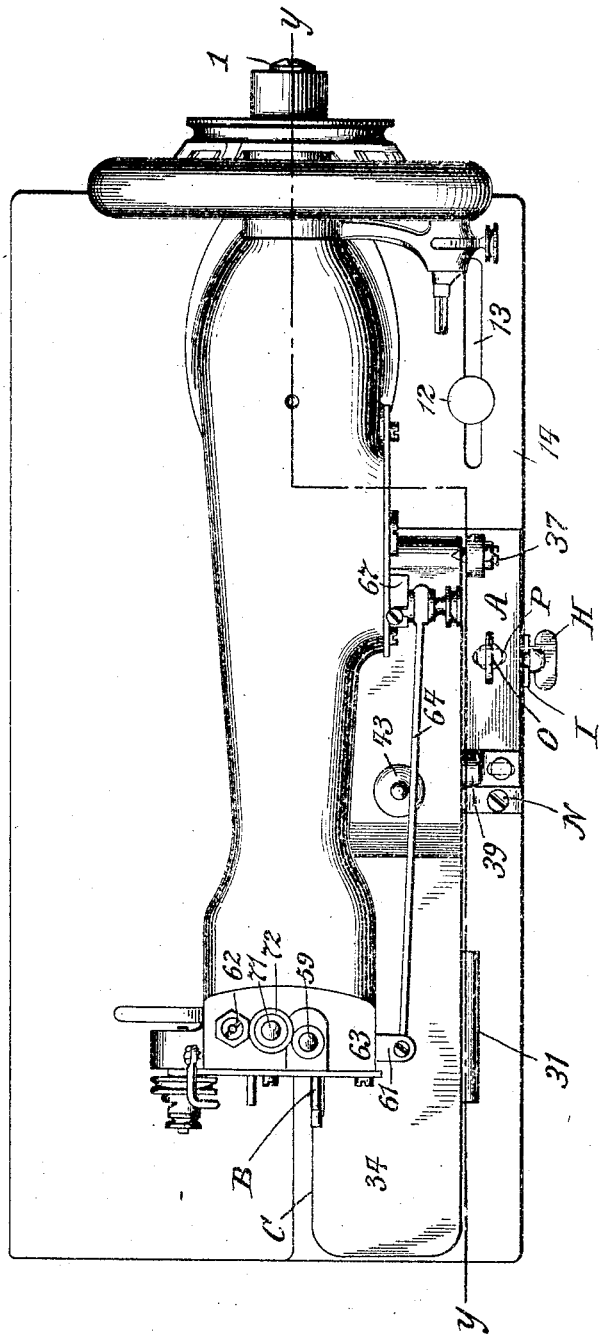
Figure 5:
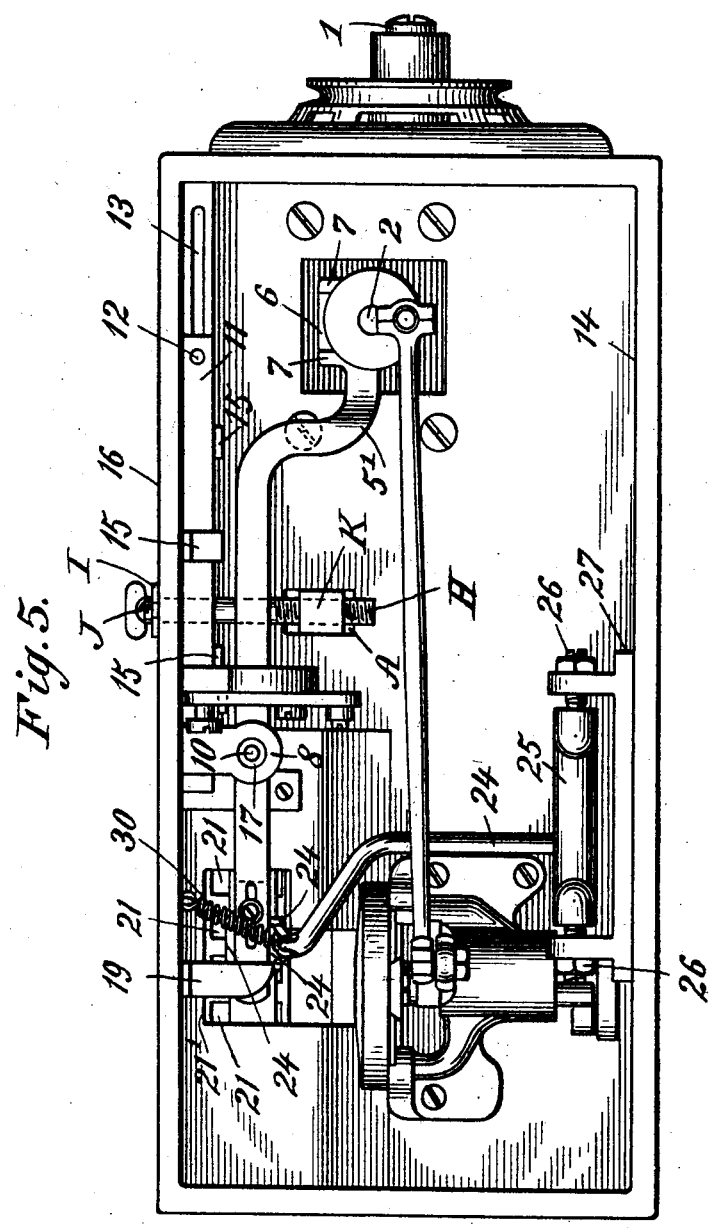

Figure 1 is an elevation of the portion of the machine that is above the bed-plate thereof and a vertical partial section of the bed-plate to show the interior parts thereof at about the lines Y Y in Fig. 4. By thus omitting the front portion of the walls of the bed-plate the observer may see a side elevation of the whole mechanism. Fig. 2 is intended to show the appearance of the machine from the left-hand end of Fig. 1 with the cover *a* removed and with the end wall of the bed-plate removed. In order to show the material in position during operation, the roller 31 and work-carrying lever 34, as well as the material, are shown in vertical section. Fig. 3 shows about the same as Fig. 2 only in a different phase, and the parts in section in Fig. 2 are not in section in Fig. 3, and the cloth or material is omitted. The mechanism under the bed-plate seen in side elevation in Fig. 1 is shown partly in section in Fig. 3 at a line passing through the compound feed-dog. In Fig. 2 the presser-foot is down. In Fig. 3 it is up, and in each figure the other mechanism has the phases belonging to these positions of the presser-foot 32. The cover $a$ is omitted in Fig. 3. Fig. 4 is a plan of the whole machine without any omissions and sections. Figs. 1 and 4 are on about the same scale; but Figs. 2 and 3 are on a much larger scale. Fig. 5 is on about the same scale as Figs. 1 and 4, and it is an inverted plan of the whole machine showing the same as looked at in an opposite direction from that in which Fig. 4 is viewed. Fig. 6 is a rear elevation of the whole machine, showing that side which is opposite to that side which is shown in Fig. 1. Fig. 7 is a plan like Fig. 4 with the head and its adjuncts and bed-plate omitted in order to illustrate the construction of the spring-pressed work-carrying lever, the spring being shown dotted where it is below the lever and portions being broken away. The presser-foot is shown with its bar in section. The remaining parts below the lever 34 are not represented. Fig. 8 is a side view of substantially all that is shown in Fig. 7 except the presser-foot, and a section of the feed-dog and of the bed-plate and a portion of the feed mechanism are added. Fig. 9 is a cross-section of the main novel elements of the machine at the location of the adjusting thumb-screws. Fig. 9$^a$ is a view of the flat needle contiguous to the roller. Fig. 10 is a horizontal section of the needle-bar-carrying frame and head 63 at about one of the positions of the yoke 73. Fig. 11 is an inverted plan of the work-carrying lever and its support with a portion of the bed-plate of the machine shown in section. Fig. 12 is a plan of the bed-plate, the head being cut off and portions of the bed-plate being cut away to partly exhibit the mechanism underneath the same, the remaining parts of that mechanism being shown dotted. Figs. 13 and 14 are different views of the movable fulcrum of the feed-dog mechanism. Figs. 15 and 16 are respectively a plan and elevation of the work-carrying lever entirely by itself, including the roller. Fig. 17 is a greatly-enlarged view in the general nature of the diagram not for indicating the mechanical construction, but to show the relative positions of the needle, with its plane surface, the roller contiguous thereto, and the cloth or material worked upon indicated by dots and dashes. Fig. 18 is a side view of what is shown in Fig. 17 with the material omitted. Fig. 19 is a greatly-enlarged section of the needle at the eye to indicate the flattened head.

Although my invention relates particularly to the work-carrying lever, yet it is correlated to an operative wedge for the feed-dog and to most of the elements that are located above the main bed-plate of the machine. Hence I will describe all the elements that have anything to do with the construction and operation of the invention.

The main horizontal shaft is 1, and the main vertical shaft is 2. The feed mechanism is operated by the two cams 3 and 4, both of which are on shaft 2. These cams 3 and 4 are so located as to engage with the compound fork on the feed-dog-operating lever 5. The fork for the cam 3 is indicated at 6, and the fork for the cam 4 is at 7. The rotation of the vertical shaft 2 turns the cams 3 and 4, and thereby operates the lever 5 for manipulating the feed-dog. The fulcrum for the lever 5 is at 8. The fulcrum 8 has a groove 9, in which is located the lever 5. The fulcrum can be adjusted to different parts of the lever. The hole 10 is for oiling the bearing-surface between the lever 5 and fulcrum 8, which is fastened upon a longitudinal rod 11, having a screw-handle 12 secured thereto and passing upward through a slot 13 in the bed-plate 14. The rod 11 is mounted in guide-brackets 15, projecting from the side wall 16 of the bed-plate. By moving the screw 12 to and fro the fulcrum is moved to different positions on the lever 5. The fulcrum consists of a steel bearing 17, having a groove a little narrower than the groove in the socket 18 for two purposes—first to subject the steel bearings 17 to the wearing action and to leave room for small vibrations of the lever 5 without striking against the socket 18. The bearing 17 lies loosely in the socket 18 to prevent a rocking motion of the lever 5. The bearing for the end of lever 5 is 19, which is fastened on the wall 16. This bracket or bearing offers a resistance or support for the lever 5 when the latter is pressed down by the work-carrying lever hereinafter described. The bend 5' is for directing the lever 5 to a lateral position under the feed-dog 20, which is in the holes 21. This feed-dog consists of several sets of teeth extending upward through the holes 21. The object of the lever 5 is to impart, first, an upward motion of the feed-dog to engage the material worked upon, then to move the feed-dog horizontally toward the operator, then downward, then horizontally away from the operator or front of the machine, as shown in Fig. 1, thereby producing four motions successively to said feed-dog 20. The upward motion is communicated to the feed-dog by the wedge 22, attached to the lever 5 and seen in Fig. 8. The sloping surface 23 of the wedge 22 bears against a corresponding inclined surface of a grooved lever-arm 24, which supports the feed-dog 20 and which extends from a rock-shaft 25, bounded between center screws 26, which are carried by a bracket 27 on the side wall 16'. When the lever 5 moves longitudinally to the left, the wedge 22 causes an upward movement of the feed-dog 20. When the lever 5 moves toward the operator, the lever-arm 24, being grooved, carries the feed-dog 20 with it, because the lever 5 is located in said groove, which is numbered 28. Likewise when one of the cams on the shaft 2 moves the lever-arm 24 away from the front of the machine the feed-dog for the same reason recedes from the operator, and subsequently the same cycle of operation may be indefinitely repeated.

The screw 29 fastens the wedge 22 to the lever 5. The lever 24 is bent several times and may be seen best in Fig. 5. The downward movement of the feed-dog 20 is caused by the reaction of the retractile spring 30, one end of which is secured to the side wall 16 and the other end to the lever 24. Therefore the upward movement of the feed-dog is caused by the wedge 22, operated by the cam 4, the downward movement by the spring 30, and both of the lateral movements by the cam 3 on the main vertical shaft 2.

An essential portion of the feed mechanism is the roller 31, which acts in conjunction with the feed-dog in such a manner as to propel the fabric or material worked upon intermittently toward the front of the machine, and this roller also acts in conjunction with the presser-foot 32 for effectually propelling the material during the operation of sewing the same. This roller has three independent motions—one a rotary motion about its axis in the bearings 33, which project downward from a spring-pressed reciprocating work-carrying lever 34. The roller 31 serves the purpose of a presser-foot upon the material 35 when it is under the work-carrying lever 34, while 32 is the presser-foot for the material 35 when it is on top of the other side of the work-carrying lever 34. The bed-plate 14 has a depressed portion 14′ approximately the diameter of the roller lower down than the main bed-plate. By this construction the material 35 is easily propelled, and yet there is a satisfactory crease 36 of the cloth at the folding edge of the lever 34. Caution should be taken to make this roller 31 of considerable diameter—say about three-fourths of an inch—so that the angle formed by the plane of the material on top of the lever 34 with the plane of the material below said lever will be about seventy degrees. The work-carrying lever 34 is pivoted between center screws 37 on the plate A, movable across the bed-plate 14, and said lever 34 is bent at 38, so that the under surface of the lever will come about flush with the bed-plate 14, as plainly indicated in Fig. 6.

39 represents brackets on the plate A for preventing any lateral give of the lever 34.

Normally the roller 31 is strongly pressed downward either against the feed-dog 20 when it is up or against the slotted plate 21′, containing the holes 21, when the feed-dog is down. The spring 40 produces this pressure, one end thereof being screwed to the plate A by the screw 41 and the other end being connected up to the vertical screw 42, passing through the lever 34 and having the adjusting milled thumb-head 43. The spring 40 passes loosely through the flat head 45 of the screw 42.

The means for raising the work-carrying lever 34 consists of a vertical rod 44, pivoted on the lever 46, whose pivot is at fulcrum 47. This lever 46 may be operated by the chain 48, a downward movement of which will lift the lever 34. While the lever 34 is up and while the presser-foot 32 is up, as shown in Fig. 3, the operator may easily insert the material 35 between the presser-foot 32 and the lever 34 and then down under the lever 34 and under the roller 31 and between it and the feed-dog 20. The lever 34 may now be lowered and the presser-foot 32 too.

55 is a needle-plate secured by a screw 56 to the bed-plate 14 and extending along the bed-plate and bent downward toward the lower bed-plate 14′ along the slope 14″, reaching from the bed-plate 14 to the bed-plate 14′. This bent plate serves as a covering for the shuttle mechanism below, and it has a hole 57 for the passage of the needle 77.

The needle 77 is carried, as usual, by a needle-bar 59, which is vertically supported in bearings 60 on the needle-bar frame 61, pivoted by center screws 62 in the head 63 of the machine. This needle-bar frame 61 may be reciprocated for the purpose of making a zigzag stitch of any desired width.

64 is a pitman connecting the needle-bar frame 61 pivotally to a thumb-screw 65, slidable back and forth along the dovetailed arc-shaped groove 66 in the arc-shaped guide 67. The movement of the thumb-screw 65 up and down will vary the lateral throw of the needle 77, the guide 67 being thrown laterally by a cam 68 behind the face-plate 69 because of a pin 70, carried by the guide 67 and operated upon by the cam 68. The outline of this cam is not shown, as it is well known in the art. Its object is to move the guide 67 to and fro when rotated by the horizontal shaft 1.

The presser-foot 32 is carried upon a presser-foot bar 71, which is located in stationary bearings 72 in the head 63 of the arm of the machine.

Upon the needle-bar 59 is carried a yoke 73, one part of which is pivoted to the link 74, which is connected up in the usual way with the horizontal shaft 1 for reciprocating the needle up and down. The yoke 73 connects with the presser-foot bar 71 and is adapted on its upward movement to strike and lift the spring-bracket 75, which is fastened upon the bar 71. The yoke 73 and the bracket 75 are so relatively adjusted that the presser-foot 32 is lifted near the upper end of the stroke of the needle. This spring-bracket is old, and so, also, is the means for manually lifting the same. Therefore they are not described further. Parts not described are not my invention, but are represented in order to indicate how the invention is connected up with the sewing-machine of a well-known type.

A roller B is provided on that head of the lever 34 about which the material is folded. This roller B has a cylindrical surface projecting beyond the edge C of the lever 34, and precaution should be taken to have this roller extend to a considerable distance on each side of the presser-foot.

The needle 77 should be straight on one side from the point to the shank D, and this straight side should face the roller B and should have a groove E for the thread. The side opposite the straight side is rounded, as usual, as at F. This construction is essential, because it is necessary for the point of the needle 77 to only just escape the roller B in its descent, and for very thin material it does no harm for the needle to actually strike the roller B, which will yield by rolling. As a consequence the thread being in the groove E will be hidden within that layer G of the cloth that is next to the roller B, so that the machine permits blindstitching of such difficult material as silk or Mackintosh cloth. For thicker material the needle 77 should be a little farther away from the roller B, and this is essential and is accomplished by moving the lever 34, together with its supporting-plate A, by means of the thumb-screw H, whose bearing I is mounted upon the overhanging side J of the plate 14. The said screw feeds a nut K, suspended from the plate A, which is guided in a depression of the main bed-plate 14, formed by the two lateral guiding-surfaces at L and M, the latter being on a strip of straight metal, which is fastened by screws N to the bed-plate 14. The plate A is held in any position by thumb-screws O, passing through slots P into the bed-plate 14.

Q represents brackets having bearings R for the roller B and attached to the under side of the lever 34.

I claim as my invention—

1. In a blindstitching sewing-machine, the combination of a constantly-reciprocating work-carrier, a roller thereon forming a folding edge about which the material to be worked upon may be folded and fed, a reciprocating needle contiguous to said roller, a bed-plate for the machine, a support for said carrier, and means for moving said support together with the carrier so that the latter may be located at different distances laterally from said needle, said carrier consisting of a lever pivoted and guided relatively to said support, and manual devices for rigidly fixing said support to said bed-plate at any of its various positions, and said means consisting of a thumb-screw having its bearing connected to the bed-plate and its traveling nut attached to said support.

2. In a blindstitching sewing-machine, the combination of a work-carrier, a roller thereon forming a folding edge about which the material to be worked upon may be folded and fed, a reciprocating needle contiguous to said roller, that side of the needle which faces the roller being straight at and in the neighborhood of the eye of the needle, and from the point upward to the shank of the needle and having a groove in the straight portion which is parallel to the axis of the needle, a bed-plate for the machine, a support for said carrier, and means for moving said support together with the carrier so that the latter may be located at different distances laterally from said needle, said carrier consisting of a lever pivoted and guided relatively to said support, and manual devices for rigidly fixing said support to said bed-plate at any of its various positions, and said means consisting of a thumb-screw having its bearing connected to the bed-plate and its traveling nut attached to said support.

3. In a blindstitching sewing-machine, the combination of a work-carrier, a roller thereon forming a folding edge about which the material to be worked upon may be folded and fed, a reciprocating needle contiguous to said roller, the surface of the roller projecting beyond the edge of the carrier, a bed-plate for the machine, a support for said carrier, and means for moving said support together with the carrier so that the latter may be located at different distances laterally from said needle, said carrier consisting of a lever pivoted and guided relatively to said support, and manual devices for rigidly fixing said support to said bed-plate at any of its various positions, and said means consisting of a thumb-screw having its bearing connected to the bed-plate and its traveling nut attached to said support.

4. In a blindstitching sewing-machine, the combination of a work-carrier, a roller thereon forming a folding edge about which the material to be worked upon may be folded and fed, a reciprocating needle contiguous to said roller, bearings for said roller attached to said carrier, a bed-plate for the machine, a support for said carrier, and means for moving said support together with the carrier so that the latter may be located at different distances laterally from said needle, said carrier consisting of a lever pivoted and guided relatively to said support, and manual devices for rigidly fixing said support to said bed-plate at any of its various positions, and said means consisting of a thumb-screw having its bearing connected to the bed-plate and its traveling nut attached to said support.

5. In a blindstitching sewing-machine, the combination of a work-carrier, a roller thereon forming a folding edge about which the material to be worked upon may be folded and fed, a reciprocating needle contiguous to said roller, the surface of the roller projecting beyond the edge of the carrier, and bearings for the roller attached to said carrier, a bed-plate for the machine, a support for said carrier, and means for moving said support together with the carrier so that the latter may be located at different distances laterally from said needle, said carrier consisting of a lever pivoted and guided relatively to said support, and manual devices for rigidly fixing said support to said bed-plate at any of its various positions, and said means consisting of a thumb-screw having its bearing connected to the bed-plate and its traveling nut attached to said support.

6. In a blindstitching sewing-machine, the combination of a work-carrier, a roller thereon forming a folding edge about which the material to be worked upon may be folded and fed, a reciprocating needle contiguous to said roller, that side of the needle which faces the roller being straight at and in the neighborhood of the eye of the needle, and from the point upward to the shank of the needle and having a groove in the straight portion which is parallel to the axis of the needle, the surface of the roller projecting beyond the edge of the carrier, bearings for the roller attached to said carrier, a bed-plate for the machine, a support for said carrier, and means for moving said support together with the carrier so that the latter may be located at different distances laterally from said needle, said carrier consisting of a lever pivoted and guided relatively to said support, and manual devices for rigidly fixing said support to said bed-plate at any of its various positions, and said means consisting of a thumb-screw having its bearing connected to the bed-plate and its traveling nut attached to said support.

7. In a blindstitching sewing-machine, the combination of a work-carrier, having a folding edge about which the material to be worked upon may be folded, a needle contiguous to and reciprocating transversely to said carrier, and provided with a grooved straight surface which faces said edge, and extends from the point of the needle upward beyond the eye thereof, a bed-plate for the machine, a support for said carrier, and means for moving said support together with the carrier so that the latter may be located at different distances laterally from said needle, said carrier consisting of a lever pivoted and guided relatively to said support, and manual devices for rigidly fixing said support to said bed-plate at any of its various positions, and said means consisting of a thumb-screw having its bearing connected to the bed-plate and its traveling nut attached to said support.

8. In a blindstitching sewing-machine, the combination of a work-carrier, a roller thereon forming a folding edge about which the material to be worked upon may be folded and fed, a reciprocating needle contiguous to said roller, the surface of the roller projecting beyond the edge of the carrier, a feed-dog, and a second roller larger than the first, parallel thereto attached to said carrier and adapted to press toward said feed-dog, a bed-plate for the machine, a support for said carrier, and means for moving said support together with the carrier so that the latter may be located at different distances laterally from said needle, said carrier consisting of a lever pivoted and guided relatively to said support, and manual devices for rigidly fixing said support to said bed-plate at any of its various positions, and said means consisting of a thumb-screw having its bearing connected to the bed-plate and its traveling nut attached to said support.

9. In a blindstitching sewing-machine, the combination of a work-carrier, a roller thereon forming a folding edge about which the material to be worked upon may be folded and fed, a reciprocating needle contiguous to said roller, bearings for said roller attached to said carrier, a feed-dog, and a second roller larger than the first, and parallel thereto attached to said carrier and adapted to press toward said feed-dog, a bed-plate for the machine, a support for said carrier, and means for moving said support together with the carrier so that the latter may be located at different distances laterally from said needle, said carrier consisting of a lever pivoted and guided relatively to said support, and manual devices for rigidly fixing said support to said bed-plate at any of its various positions, and said means consisting of a thumb-screw having its bearings connected to the bed-plate and its traveling nut attached to said support.

10. In a blindstitching sewing-machine, the combination of a work-carrier, a roller thereon forming a folding edge about which the material to be worked upon may be folded and fed, a reciprocating needle contiguous to said roller, the surface of the roller projecting beyond the edge of the carrier, bearings for the roller attached to said carrier, a feed-dog, and a second roller larger than the first, parallel thereto attached to said carrier and adapted to press toward said feed-dog, a bed-plate for the machine, a support for said carrier, and means for moving said support together with the carrier so that the latter may be located at different distances laterally from said needle, said carrier consisting of a lever pivoted and guided relatively to said support, and manual devices for rigidly fixing said support to said bed-plate at any of its various positions, and said means consisting of a thumb-screw having its bearing connected to the bed-plate and its traveling nut attached to said support.

11. In a blindstitching sewing-machine, the combination of a work-carrier, a roller thereon forming a folding edge about which the material to be worked upon may be folded and fed, a reciprocating needle contiguous to said roller, that side of the needle which faces the roller being straight at and in the neighborhood of the eye of the needle, and from the point upward to the shank of the needle and having a groove in the straight portion which is parallel to the axis of the needle, the surface of the roller projecting beyond the edge of the carrier, bearings for the roller attached to said carrier, a feed-dog, and a second roller larger than the first, parallel thereto attached to said carrier and adapted to press toward said feed-dog, a bed-plate for the machine, a support for said carrier, and means for moving said support together with the carrier so that the latter may be located at different distances laterally from said needle, said carrier consisting of a lever pivoted and guided relatively to said support, and manual devices for rigidly fixing said support to said bed-plate at any of its various positions, and said means consisting of a thumb-screw having its bearing connected to the bed-plate and its traveling nut attached to said support.

12. In a blindstitching sewing-machine, the combination of a work-carrier, having a folding edge about which the material to be worked upon may be folded, and a needle contiguous to and reciprocating transversely to said carrier, and provided with a grooved straight surface which faces said edge, and extends from the point of the needle upward beyond the eye thereof, a feed-dog, and a roller parallel to the said folding edge and attached to said carrier and adapted to press toward said feed-dog, a bed-plate for the machine, a support for said carrier, and means for moving said support together with the carrier so that the latter may be located at different distances laterally from said needle, said carrier consisting of a lever pivoted and guided relatively to said support, and manual devices for rigidly fixing said support to said bed-plate at any of its various positions, and said means consisting of a thumb-screw having its bearing connected to the bed-plate and its traveling nut attached to said support.

13. In a blindstitching sewing-machine, the combination of a work-carrier, having a folding edge about which the material to be worked upon may be folded, a needle contiguous to and reciprocating transversely to said carrier, and provided with a grooved straight surface which faces said edge, and extends from the point of the needle upward beyond the eye thereof, a feed-dog, and a roller parallel to the said folding edge and attached to said carrier and adapted to press toward said feed-dog, bearings for said roller attached to the under side of said carrier, a bed-plate for the machine, a support for said carrier, and means for moving said support together with the carrier so that the latter may be located at different distances laterally from said needle, said carrier consisting of a lever pivoted and guided relatively to said support, and manual devices for rigidly fixing said support to said bed-plate at any of its various positions, and said means consisting of a thumb-screw having its bearing connected to the bed-plate and its traveling nut attached to said support.

14. In a blindstitching sewing-machine, the combination of a work-carrier, a roller thereon forming a folding edge about which the material to be worked upon may be folded and fed, a reciprocating needle contiguous to said roller, a bed-plate for the machine, a support for said carrier, and means for moving said support together with the carrier so that the latter may be located at different distances from said needle, said carrier consisting of a lever pivoted and guided relatively to said support, and manual devices for rigidly fixing said support to said bed-plate at any of its various positions, and said means consisting of a thumb-screw having its bearing connected to the bed-plate and its traveling nut attached to said support.

15. In a blindstitching sewing-machine, the combination of a work-carrier, a roller thereon forming a folding edge about which the material to be worked upon may be folded and fed, a reciprocating needle contiguous to said roller, that side of the needle which faces the roller being straight at and in the neighborhood of the eye of the needle, and from the point upward to the shank of the needle and having a groove in the straight portion which is parallel to the axis of the needle, a bed-plate for the machine, a support for said carrier, means for moving said support together with the carrier so that the latter may be located at different distances laterally from said needle, said carrier consisting of a lever pivoted and guided relatively to said support, and manual devices for rigidly fixing said support to said bed-plate at any of its various positions, and said means consisting of a thumb-screw having its bearing connected to the bed-plate and its traveling nut attached to said support.

16. In a blindstitching sewing-machine, the combination of a work-carrrier, a roller thereon forming a folding edge about which the material to be worked upon may be folded and fed, a reciprocating needle contiguous to said roller, the surface of the roller projecting beyond the edge of the carrier, a bed-plate for the machine, a support for said carrier, means for moving said support together with the carrier so that the latter may be located at different distances laterally from said needle, said carrier consisting of a lever pivoted and guided relatively to said support, and manual devices for rigidly fixing said support to said bed-plate at any of its various positions, and said means consisting of a thumb-screw having its bearing connected to the bed-plate and its traveling nut attached to said support.

17. In a blindstitching sewing-machine, the combination of a work-carrier, a roller thereon forming a folding edge about which the material to be worked upon may be folded and fed, a reciprocating needle contiguous to said roller, bearings for said roller attached to said carrier, a bed-plate for the machine, a support for said carrier, means for moving said support together with the carrier so that the latter may be located at different distances laterally from said needle, said carrier consisting of a lever pivoted and guided relatively to said support, and manual devices for rigidly fixing said support to said bed-plate at any of its various positions, and said means consisting of a thumb-screw having its bearing connected to the bed-plate and its traveling nut attached to said support.

18. In a blindstitching sewing-machine, the combination of a work-carrier, a roller thereon forming a folding edge about which the material to be worked upon may be folded and fed, a reciprocating needle contiguous to said roller, the surface of the roller projecting beyond the edge of the carrier, bearings for the roller attached to said carrier, a bed-plate for the machine, a support for said carrier, means for moving said support together with the carrier so that the latter may be located at different distances laterally from said needle, said carrier consisting of a lever pivoted and guided relatively to said support, and manual devices for rigidly fixing said support to said bed-plate at any of its various positions, and said means consisting of a thumb-screw having its bearing connected to the bed-plate and its traveling nut attached to said support.

19. In a blindstitching sewing-machine, the combination of a work-carrier, a roller thereon forming a folding edge about which the material to be worked upon may be folded and fed, a reciprocating needle contiguous to said roller, that side of the needle which faces the roller being straight at and in the neighborhood of the eye of the needle, and from the point upward to the shank of the needle and having a groove in the straight portion which is parallel to the axis of the needle, the surface of the roller projecting beyond the edge of the carrier, bearings for the roller attached to said carrier, a bed-plate for the machine, a support for said carrier, means for moving said support together with the carrier so that the latter may be located at different distances laterally from said needle, said carrier consisting of a lever pivoted and guided relatively to said support, and manual devices for rigidly fixing said support to said bed-plate at any of its various positions, and said means consisting of a thumb-screw having its bearing connected to the bed-plate and its traveling nut attached to said support.

20. In a blindstitching sewing-machine, the combination of a work-carrier, having a folding edge about which the material to be worked upon may be folded, a needle contiguous to and reciprocating transversely to said carrier, and provided with a grooved straight surface which faces said edge, and extends from the point of the needle upward beyond the eye thereof, a bed-plate for the machine, a support for said carrier, means for moving said support together with the carrier so that the latter may be located at different distances laterally from said needle, said carrier consisting of a lever pivoted and guided relatively to said support, and manual devices for rigidly fixing said support to said bed-plate at any of its various positions, and said means consisting of a thumb-screw having its bearing connected to the bed-plate and its traveling nut attached to said support.

21. In a blindstitching sewing-machine, the combination of a work-carrier, a roller thereon forming a folding edge about which the material to be worked upon may be folded and fed, a reciprocating needle contiguous to said roller, the surface of the roller projecting beyond the edge of the carrier, a feed-dog, and a second roller larger than the first, and parallel thereto attached to said carrier and adapted to press toward said feed-dog, a bed-plate for the machine, a support for said carrier, means for moving said support together with the carrier so that the latter may be located at different distances laterally from said needle, said carrier consisting of a lever pivoted and guided relatively to said support, and manual devices for rigidly fixing said support to said bed-plate at any of its various positions, and said means consisting of a thumb-screw having its bearing connected to the bed-plate and its traveling nut attached to said support.

22. In a blindstitching sewing-machine, the combination of a work-carrier, a roller thereon forming a folding edge about which the material to be worked upon may be folded and fed, a reciprocating needle contiguous to said roller, bearings for said roller attached to said carrier, a feed-dog, and a second roller larger than the first, and parallel thereto attached to said carrier and adapted to press toward said feed-dog, a bed-plate for the machine, a support for said carrier, means for moving said support together with the carrier so that the latter may be located at different distances laterally from said needle, said carrier consisting of a lever pivoted and guided relatively to said support, and manual devices for rigidly fixing said support to said bed-plate at any of its various positions, and said means consisting of a thumb-screw having its bearing connected to the bed-plate and its traveling nut attached to said support.

23. In a blindstitching sewing-machine, the combination of a work-carrier, a roller thereon forming a folding edge about which the material to be worked upon may be folded and fed, a reciprocating needle contiguous to said roller, the surface of the roller projecting beyond the edge of the carrier, bearings for the roller attached to said carrier, a feed-dog, and a second roller larger than the first, parallel thereto attached to said carrier and adapted to press toward said feed-dog, a bed-plate for the machine, a support for said carrier, means for moving said support together with the carrier so that the latter may be located at different distances laterally from said needle, said carrier consisting of a lever pivoted and guided relatively to said support, and manual devices for rigidly fixing said support to said bed-plate at any of its various positions, and said means consisting of a thumb-screw having its bearing connected to the bed-plate and its traveling nut attached to said support.

24. In a blindstitching sewing-machine, the combination of a work-carrier, a roller thereon forming a folding edge about which the material to be worked upon may be folded and fed, a reciprocating needle contiguous to said roller, that side of the needle which faces the roller being straight at and in the neighborhood of the eye of the needle, and from the point upward to the shank of the needle and having a groove in the straight portion which is parallel to the axis of the needle, the surface of the roller projecting beyond the edge of the carrier, bearings for the roller attached to said carrier, a feed-dog, and a second roller larger than the first, and parallel thereto attached to said carrier and adapted to press toward said feed-dog, a bed-plate for the machine, a support for said carrier, means for moving said support together with the carrier so that the latter may be located at different distances laterally from said needle, said carrier consisting of a lever pivoted and guided relatively to said support, and manual devices for rigidly fixing said support to said bed-plate at any of its various positions, and said means consisting of a thumb-screw having its bearing connected to the bed-plate and its traveling nut attached to said support.

25. In a blindstitching sewing-machine, the combination of a work-carrier, having a folding edge about which the material to be worked upon may be folded, a needle contiguous to and reciprocating transversely to said carrier, and provided with a grooved straight surface which faces said edge, and extends from the point of the needle upward beyond the eye thereof, a feed-dog, and a roller parallel to the said folding edge and attached to said carrier and adapted to press toward said feed-dog, a bed-plate for the machine, a support for said carrier, means for moving said support together with the carrier so that the latter may be located at different distances laterally from said needle, said carrier consisting of a lever pivoted and guided relatively to said support, and manual devices for rigidly fixing said support to said bed-plate at any of its various positions, and said means consisting of a thumb-screw having its bearing connected to the bed-plate and its traveling nut attached to said support.

26. In a blindstitching sewing-machine, the combination of a work-carrier, having a folding edge about which the material to be worked upon may be folded, a needle contiguous to and reciprocating transversely to said carrier, and provided with a grooved straight surface which faces said edge, and extends from the point of the needle upward beyond the eye thereof, a feed-dog, and a roller parallel to the said folding edge and attached to said carrier and adapted to press toward said feed-dog, bearings for said roller attached to the under side of said carrier, a bed-plate for the machine, a support for said carrier, means for moving said support together with the carrier so that the latter may be located at different distances laterally from said needle, said carrier consisting of a lever pivoted and guided relatively to said support, and manual devices for rigidly fixing said support to said bed-plate at any of its various positions, and said means consisting of a thumb-screw having its bearing connected to the bed-plate and its traveling nut attached to said support.

27. In a blindstitching sewing-machine, the combination of a work-carrier, having a folding edge about which the material to be worked upon may be folded, a needle contiguous to and reciprocating transversely to said carrier, and provided with a grooved straight surface which faces said edge, and extends from the point of the needle upward beyond the eye thereof, a feed-dog, and a roller parallel to the said folding edge and attached to said carrier and adapted to press toward said feed-dog, bearings for said roller attached to the under side of said carrier, a bed-plate for the machine, a support for said carrier, means for moving said support together with the carrier so that the latter may be located at different distances laterally from said needle, said carrier consisting of a lever pivoted and guided relatively to said support, manual devices for rigidly fixing said support to said bed-plate at any of its various positions, and said means consisting of a thumb-screw having its bearing connected to the bed-plate and its traveling nut attached to said support, said bed-plate having a depression with guiding-surfaces for receiving, holding and guiding said support.

28. In a blindstitching sewing-machine, the combination of a work-carrier, having a folding edge about which the material to be worked upon may be folded, a needle contiguous to and reciprocating transversely to said carrier, and provided with a grooved straight surface which faces said edge, and extends from the point of the needle upward beyond the eye thereof, a feed-dog, and a roller parallel to the said folding edge and attached to said carrier and adapted to press toward said feed-dog, bearings for said roller attached to the under side of said carrier, a bed-plate for the machine, a support for said carrier, means for moving said support together with the carrier so that the latter may be located at different distances laterally from said needle, said carrier consisting of a lever pivoted and guided relatively to said support, and manual devices for rigidly fixing said support to said bed-plate at any of its various positions, and said means consisting of a thumb-screw having its bearing connected to the bed-plate and its traveling nut attached to said support, said bed-plate having a depression with guiding-surfaces for receiving, holding and guiding said support, a fulcrum for said lever, consisting of pivots extending upward from said support and carried thereby.

29. In a blindstitching sewing-machine, the combination of a work-carrier, having a folding edge about which the material to be worked upon may be folded, a needle contiguous to and reciprocating transversely to said carrier, and provided with a grooved straight surface which faces said edge, and extends from the point of the needle upward beyond the eye thereof, a feed-dog, and a roller parallel to the said folding edge and attached to said carrier and adapted to press toward said feed-dog, bearings for said roller attached to the under side of said carrier, a bed-plate for the machine, a support for said carrier, means for moving said support together with the carrier so that the latter may be located at different distances laterally from said needle, said carrier consisting of a lever pivoted and guided relatively to said support, manual devices for rigidly fixing said support to said bed-plate at any of its various positions, and said means consisting of a thumb-screw having its bearing connected to the bed-plate and its traveling nut attached to said support, said bed-plate having a depression with guiding-surfaces for receiving, holding and guiding said support, a fulcrum for said lever, consisting of pivots extending upward from said support and carried thereby, the guides for said lever being carried by said support.

30. In a blindstitching sewing-machine, the combination of a work-carrier, having a folding edge about which the material to be worked upon may be folded, a needle contiguous to and reciprocating transversely to said carrier, and provided with a grooved straight surface which faces said edge, and extends from the point of the needle upward beyond the eye thereof, a feed-dog, and a roller parallel to the said folding edge and attached to said carrier and adapted to press toward said feed-dog, bearings for said roller attached to the under side of said carrier, a bed-plate for the machine, a support for said carrier, means for moving said support together with the carrier so that the latter may be located at different distances laterally from said needle, said carrier consisting of a lever pivoted and guided relatively to said support, and manual devices for rigidly fixing said support to said bed-plate at any of its various positions, and said means consisting of a thumb-screw having its bearing connected to the bed-plate and its traveling nut attached to said support, said bed-plate having a depression with guiding-surfaces for receiving, holding and guiding said support, a fulcrum for said lever, consisting of pivots extending upward from said support and carried thereby, the guides for said lever being carried by said support, and a spring action between said lever and said support.

31. In a blindstitching sewing-machine, the combination of a work-carrier, having a folding edge about which the material to be worked upon may be folded, a needle contiguous to and reciprocating transversely to said carrier, and provided with a grooved straight surface which faces said edge, and extends from the point of the needle upward beyond the eye thereof, a feed-dog, and a roller parallel to the said folding edge and attached to said carrier and adapted to press toward said feed-dog, bearings for said roller attached to the under side of said carrier, a bed-plate for the machine, a support for said carrier, means for moving said support together with the carrier so that the latter may be located at different distances laterally from said needle, said carrier consisting of a lever pivoted and guided relatively to said support, manual devices for rigidly fixing said support to said bed-plate at any of its various positions, and said means consisting of a thumb-screw having its bearings connected to the bed-plate and its traveling nut attached to said support, said bed-plate having a depression with guiding-surfaces for receiving, holding and guiding said support, a fulcrum for said lever, consisting of pivots extending upward from said support and carried thereby, the guides for said lever being carried by said support, and a spring action between said lever and said support, the manual devices for fixing the support consisting of screws passing through slotted holes in said support and extending into threaded holes in said bed-plate.

32. In a blindstitching sewing-machine, the combination of a work-carrier, having a folding edge about which the material to be worked upon may be folded, a needle contiguous to and reciprocating transversely to said carrier, and provided with a grooved straight surface which faces said edge, and extends from the point of the needle upward beyond the eye thereof, a feed-dog, and a roller parallel to the said folding edge and attached to said carrier and adapted to press toward said feed-dog, bearings for said roller attached to the under side of said carrier, a bed-plate for the machine, a support for said carrier, means for moving said support together with the carrier so that the latter may be located at different distances laterally from said needle, said carrier consisting of a lever pivoted and guided relatively to said support, manual devices for rigidly fixing said support to said bed-plate at any of its various positions, and said means consisting of a thumb-screw having its bearing connected to the bed-plate and its traveling nut attached to said support, said bed-plate having a depression with guiding-surfaces for receiving, holding and guiding said support, a fulcrum for said lever, consisting of pivots extending upward from said support and carried thereby, the guides for said lever being carried by said support, and a spring action between said lever and said support, the manual devices for fixing the support consisting of screws passing through slotted holes in said support and extending into threaded holes in said bed-plate, said pivots consisting of a pair of center screws.

33. In a blindstitching sewing-machine, the combination of a work-carrier, a roller thereon forming a folding edge about which the material to be worked upon may be folded and fed, and a reciprocating needle contiguous to said roller, the surface of said roller being cylindrical, a bed-plate for the machine, a support for said carrier, and means for moving said support together with the carrier so that the latter may be located at different distances laterally from said needle, said carrier consisting of a lever pivoted and guided relatively to said support, and manual devices for rigidly fixing said support to said bed-plate at any of its various positions.

34. In a blindstitching sewing-machine, the combination of a work-carrier, a roller thereon forming a folding edge about which the material to be worked upon may be folded and fed, a reciprocating needle contiguous to said roller, the surface of said roller being cylindrical, a bed-plate for the machine, a support for said carrier, means for moving said support together with the carrier so that the latter may be located at different distances laterally from said needle, said carrier consisting of a lever pivoted and guided relatively to said support, manual devices for rigidly fixing said support to said bed-plate at any of its various positions, a driver for the machine, mechanism for giving a lateral throw to said needle in a direction parallel to the axis of said roller, automatically operated by said driver, and a device for adjusting said mechanism to vary the lateral throw of said needle.

35. In a blindstitching sewing-machine, the combination of a work-carrier having a folding edge about which the material to be worked upon may be folded, a needle contiguous to and reciprocating transversely to said carrier, and provided with a grooved straight surface which faces said edge and extends from the point of the needle upward beyond the eye thereof, a bed-plate for the machine, a support for said carrier, means for moving said support together with the carrier so that the latter may be located at different distances laterally from said needle, said carrier consisting of a lever pivoted and guided relatively to said support, manual devices for rigidly fixing said support to said bed-plate at any of its various positions, said means consisting of a thumb-screw having its bearing connected to the bed-plate and its traveling nut attached to said support, a driver for the machine, mechanism for giving a lateral throw to said needle in a direction parallel to the folding edge, automatically operated by said driver, and a device for adjusting said mechanism to vary the lateral throw of said needle.

36. In a blindstitching sewing-machine, the combination of a vertically and longitudinally reciprocating vertical needle, a work-carrying lever with substantially a horizontal surface, and having the axis of its fulcrum horizontal, a head by which the needle is carried, and located directly over said lever which extends from a point beyond said bed to a point under said bed, a cylindrical roller on one side of said lever and having its axis in a plane which is perpendicular to the axis of said fulcrum and parallel to the axis of said needle, a presser-foot at a predetermined distance above said lever, a feed-dog directly below said lever, whereby the material to be worked upon may pass between said presser-foot and said lever, and then over said feed-dog, a spring pressing said presser-foot down upon said lever, means for automatically raising said presser-foot at each stroke of the needle and while the needle is raised, a second spring pressing said lever down upon said feed-dog, a driver for the machine, mechanism for giving a lateral throw to said needle in a direction parallel to the axis of said roller, automatically operated by said driver, and a device for adjusting said mechanism to vary the lateral throw of said needle.

37. In a blindstitching sewing-machine, the combination of a work-carrier, a roller thereon forming a folding edge about which the material to be worked upon may be folded and fed, a reciprocating needle contiguous to said roller, the surface of the roller projecting beyond the edge of the carrier, a feed-dog, and a second roller larger than the first, and parallel thereto attached to said carrier and adapted to press toward said feed-dog, a bed-plate for the machine, a support for said carrier, means for moving said support together with the carrier so that the latter may be located at different distances laterally from said needle, said carrier consisting of a lever pivoted and guided relatively to said support, manual devices for rigidly fixing said support to said bed-plate at any of its various positions, said means consisting of a thumb-screw having its bearing connected to the bed-plate and its traveling nut attached to said support, a driver for the machine, and mechanism for giving a lateral throw to said needle in a direction parallel to the axis of said roller, automatically operated by said driver, and a device for adjusting said mechanism to vary the lateral throw of said needle.

38. In a blindstitching sewing-machine, the combination of a work-carrier, having a folding edge about which the material to be worked upon may be folded, a needle contiguous to and reciprocating transversely to said carrier, and provided with a grooved straight surface which faces said edge, and extends from the point of the needle upward beyond the eye thereof, a feed-dog, and a roller parallel to the said folding edge and attached to said carrier and adapted to press toward said feed-dog, bearings for said roller attached to the under side of said carrier, a bed-plate for the machine, a support for said carrier, means for moving said support together with the carrier so that the latter may be located at different distances laterally from said needle, said carrier consisting of a lever pivoted and guided relatively to said support, manual devices for rigidly fixing said support to said bed-plate at any of its various positions, said means consisting of a thumb-screw having its bearing connected to the bed-plate and its traveling nut attached to said support, said bed-plate having a depression with guiding-surfaces for receiving, holding and guiding said support, and said bed-plate having a second depression under said carrier.

39. In a blindstitching sewing-machine, the combination of a work-carrier, having a folding edge about which the material to be worked upon may be folded, a needle contiguous to and reciprocating transversely to said carrier, and provided with a grooved straight surface which faces said edge, and extends from the point of the needle upward beyond the eye thereof, a feed-dog, and a roller parallel to the said folding edge and attached to said carrier and adapted to press toward said feed-dog, bearings for said roller attached to the under side of said carrier, a bed-plate for the machine, a support for said carrier, means for moving said support together with the carrier so that the latter may be located at different distances laterally from said needle, said carrier consisting of a lever pivoted and guided relatively to said support, manual devices for rigidly fixing said support to said bed-plate at any of its various positions, said means consisting of a thumb-screw having its bearing connected to the bed-plate and its traveling nut attached to said support, said bed-plate having a depression with guiding-surfaces for receiving, holding and guiding said support, a fulcrum for said lever, consisting of pivots extending upward from said support and carried thereby, said bed-plate having a second depression under said lever.

40. In a blindstitching sewing-machine, the combination of a work-carrier, having a folding edge about which the material to be worked upon may be folded, a needle contiguous to and reciprocating transversely to said carrier, and provided with a grooved straight surface which faces said edge, and extends from the point of the needle upward beyond the eye thereof, a feed-dog, and a roller parallel to the said folding edge and attached to said carrier and adapted to press toward said feed-dog, bearings for said roller attached to the under side of said carrier, a bed-plate for the machine, a support for said carrier, means for moving said support together with the carrier so that the latter may be located at different distances laterally from said needle, said carrier consisting of a lever pivoted and guided relatively to said support, manual devices for rigidly fixing said support to said bed-plate at any of its various positions, said means consisting of a thumb-screw having its bearings connected to the bed-plate and its traveling nut attached to said support, said bed-plate having a depression with guiding-surfaces for receiving, holding and guiding said support, a fulcrum for said lever, consisting of pivots extending upward from said support and carried thereby, the guides for said lever being carried by said support, said bed-plate having a second depression under said lever.

41. In a blindstitching sewing-machine, the combination of a work-carrier, having a folding edge about which the material to be worked upon may be folded, a needle contiguous to and reciprocating transversely to said carrier, and provided with a grooved straight surface which faces said edge, and extends from the point of the needle upward beyond the eye thereof, a feed-dog, and a roller parallel to the said folding edge and attached to said carrier and adapted to press toward said feed-dog, bearings for said roller attached to the under side of said carrier, a bed-plate for the machine, a support for said carrier, means for moving said support together with the carrier so that the latter may be located at different distances laterally from said needle, said carrier consisting of a lever pivoted and guided relatively to said support, manual devices for rigidly fixing said support to said bed-plate at any of its various positions, said means consisting of a thumb-screw having its bearing connected to the bed-plate and its traveling nut attached to said support, said bed-plate having a depression with guiding-surfaces for receiving, holding and guiding said support, a fulcrum for said lever, consisting of pivots extending upward from said support and carried thereby, the guides for said lever being carried by said support, a spring action between said lever and said support, said bed-plate having a second depression under said lever.

42. In a blindstitching sewing-machine, the combination of a work-carrier, having a folding edge about which the material to be worked upon may be folded, a needle contiguous to and reciprocating transversely to said carrier, and provided with a grooved straight surface which faces said needle edge, and extends from the point of the needle upward beyond the eye thereof, a feed-dog, and a roller parallel to the said folding edge and attached to said carrier and adapted to press toward said feed-dog, bearings for said roller attached to the under side of said carrier, a bed-plate for the machine, a support for said carrier, means for moving said support together with the carrier so that the latter may be located at different distances laterally from said needle, said carrier consisting of a lever pivoted and guided relatively to said support, manual devices for rigidly fixing said support to said bed-plate at any of its various positions, and said means consisting of a thumb-screw having its bearings connected to the bed-plate and its traveling nut attached to said support, said bed-plate having a depression with guiding-surfaces for receiving, holding and guiding said support, a fulcrum for said lever, consisting of pivots extending upward from said support and carried thereby, the guides for said lever being carried by said support, a spring action between said lever and said support, the manual devices for fixing the support consisting of screws passing through slotted holes in said support and extending into threaded holes in said bed-plate, said bed-plate having a second depression under said lever.

43. In a blindstitching sewing-machine, the combination of a work-carrier, having a folding edge about which the material to be worked upon may be folded, a needle contiguous to and reciprocating transversely to said carrier, and provided with a grooved straight surface which faces said edge, and extends from the point of the needle upward beyond the eye thereof, a feed-dog, a roller parallel to the said folding edge and attached to said carrier and adapted to press toward said feed-dog, bearings for said roller attached to the under side of said carrier, a bed-plate for the machine, a support for said carrier, means for moving said support together with the carrier so that the latter may be located at different distances laterally from said needle, said carrier consisting of a lever pivoted and guided relatively to said support, manual devices for rigidly fixing said support to said bed-plate at any of its various positions, said means consisting of a thumb-screw having its bearings connected to the bed-plate and its traveling nut attached to said support, said bed-plate having a depression with guiding-surfaces for receiving, holding and guiding said support, a fulcrum for said lever, consisting of pivots extending upward from said support and carried thereby, the guides for said lever being carried by said support, a spring action between said lever and said support, the manual devices for fixing the support consisting of screws passing through slotted holes in said support and extending into threaded holes in said bed-plate, said pivots consisting of a pair of center screws, said bed-plate having a second depression under said lever.

44. In a blindstitching sewing-machine, the combination of a work-carrier, having a folding edge about which the material to be worked upon may be folded, a needle contiguous to and reciprocating transversely to said carrier, and provided with a grooved straight surface which faces said edge, and extends from the point of the needle upward beyond the eye thereof, a feed-dog, and a roller parallel to the said folding edge and attached to said carrier and adapted to press toward said feed-dog, bearings for said roller attached to the under side of said carrier, a bed-plate for the machine, a support for said carrier, means for moving said support together with the carrier so that the latter may be located at different distances laterally from said needle, said carrier consisting of a lever pivoted and guided relatively to said support, manual devices for rigidly fixing said support to said bed-plate at any of its various positions, said means consisting of a thumb-screw having its bearing connected to the bed-plate and its traveling nut attached to said support, said bed-plate having a depression with guiding-surfaces for receiving, holding and guiding said support, said bed-plate having a second depression under said carrier, the under surface of the carrier being in about the same plane as the main top surface of said bed-plate.

45. In a blindstitching sewing-machine, the combination of a work-carrier, having a folding edge about which the material to be worked upon may be folded, a needle contiguous to and reciprocating transversely to said carrier, and provided with a grooved straight surface which faces said edge, and extends from the point of the needle upward beyond the eye thereof, a feed-dog, and a roller parallel to the said folding edge and attached to said carrier and adapted to press toward said feed-dog, bearings for said roller attached to the under side of said carrier, a bed-plate for the machine, a support for said carrier, means for moving said support together with the carrier so that the latter may be located at different distances laterally from said needle, said carrier consisting of a lever pivoted and guided relatively to said support, manual devices for rigidly fixing said support to said bed-plate at any of its various positions, said means consisting of a thumb-screw having its bearing connected to the bed-plate and its traveling nut attached to said support, said bed-plate having a depression with guiding-surfaces for receiving, holding and guiding said support, a fulcrum for said lever, consisting of pivots extending upward from said support and carried thereby, said bed-plate having a second depression under said lever, the under surface of the lever being in about the same plane as the main top surface of said bed-plate.

46. In a blindstitching sewing-machine, the combination of a work-carrier, having a folding edge about which the material to be worked upon may be folded, a needle contiguous to and reciprocating transversely to said carrier, and provided with a grooved straight surface which faces said edge, and extends from the point of the needle upward beyond the eye thereof, a feed-dog, and a roller parallel to the said folding edge and attached to said carrier and adapted to press toward said feed-dog, bearings for said roller attached to the under side of said carrier, a bed-plate for the machine, a support for said carrier, means for moving said support together with the carrier so that the latter may be located at different distances laterally from said needle, said carrier consisting of a lever pivoted and guided relatively to said support, manual devices for rigidly fixing said support to said bed-plate at any of its various positions, said means consisting of a thumb-screw having its bearings connected to the bed-plate and its traveling nut attached to said support, said bed-plate having a depression with guiding-surfaces for receiving, holding and guiding said support, a fulcrum for said lever, consisting of pivots extending upward from said support and carried thereby, the guides for said lever being carried by said support, said bed-plate having a second depression under said lever, the under surface of the lever being in about the same plane as the main top surface of said bed-plate.

47. In a blindstitching sewing-machine, the combination of a work-carrier, having a folding edge about which the material to be worked upon may be folded, a needle contiguous to and reciprocating transversely to said carrier, and provided with a grooved straight surface which faces said edge, and extends from the point of the needle upward beyond the eye thereof, a feed-dog, and a roller parallel to the said folding edge and attached to said carrier and adapted to press toward said feed-dog, bearings for said roller attached to the under side of said carrier, a bed-plate for the machine, a support for said carrier, means for moving said support together with the carrier so that the latter may be located at different distances laterally from said needle, said carrier consisting of a lever pivoted and guided relatively to said support, manual devices for rigidly fixing said support to said bed-plate at any of its various positions, said means consisting of a thumb-screw having its bearing connected to the bed-plate and its traveling nut attached to said support, said bed-plate having a depression with guiding-surfaces for receiving, holding and guiding said support, a fulcrum for said lever, consisting of pivots extending upward from said support and carried thereby, the guides for said lever being carried by said support, a spring action between said lever and said support, said bed-plate having a second depression under said lever, the under surface of the lever being in about the same plane as the main top surface of said bed-plate.

48. In a blindstitching sewing-machine, the combination of a work-carrier, having a folding edge about which the material to be worked upon may be folded, a needle contiguous to and reciprocating transversely to said carrier, and provided with a grooved straight surface which faces said edge, and extends from the point of the needle upward beyond the eye thereof, a feed-dog, and a roller parallel to the said folding edge and attached to said carrier and adapted to press toward said feed-dog, bearings for said roller attached to the under side of said carrier, a bed-plate for the machine, a support for said carrier, means for moving said support together with the carrier so that the latter may be located at different distances laterally from said needle, said carrier consisting of a lever pivoted and guided relatively to said support, manual devices for rigidly fixing said support to said bed-plate at any of its various positions, said means consisting of a thumb-screw having its bearings connected to the bed-plate and its traveling nut attached to said support, said bed-plate having a depression with guiding-surfaces for receiving, holding and guiding said support, a fulcrum for said lever, consisting of pivots extending upward from said support and carried thereby, the guides for said lever being carried by said support, a spring action between said lever and said support, the manual devices for fixing the support consisting of screws passing through slotted holes in said support and extending into threaded holes in said bed-plate, said bed-plate having a second depression under said lever, the under surface of the lever being in about the same plane as the main top surface of said bed-plate.

49. In a blindstitching sewing-machine, the combination of a work-carrier, having a folding edge about which the material to be worked upon may be folded, a needle contiguous to and reciprocating transversely to said carrier, and provided with a grooved straight surface which faces said edge, and extends from the point of the needle upward beyond the eye thereof, a feed-dog, a roller parallel to the said folding edge and attached to said carrier and adapted to press toward said feed-dog, bearings for said roller attached to the under side of said carrier, a bed-plate for the machine, a support for said carrier, means for moving said support together with the carrier so that the latter may be located at different distances laterally from said needle, said carrier consisting of a lever pivoted and guided relatively to said support, manual devices for rigidly fixing said support to said bed-plate at any of its various positions, said means consisting of a thumb-screw having its bearings connected to the bed-plate and its traveling nut attached to said support, said bed-plate having a depression with guiding-surfaces for receiving, holding and guiding said support, a fulcrum for said lever, consisting of pivots extending upward from said support and carried thereby, the guides for said lever being carried by said support, a spring action between said lever and said support, the manual devices for fixing the support consisting of screws passing through slotted holes in said support and extending into threaded holes in said bed-plate, said pivots consisting of a pair of center screws, said bed-plate having a second depression under said lever, the under surface of the lever being in about the same plane as the main top surface of said bed-plate.

50. In a blindstitching sewing-machine, the combination of a vertically and longitudinally reciprocating vertical needle, a work-carrying lever with substantially a horizontal upper surface, and having the axis of its fulcrum horizontal, a head by which the needle is carried, and located directly over said lever, which extends from a point beyond said head to a point under said head, and a straight-edge roller on one side of said lever and having its axis in a plane which is perpendicular to the axis of said fulcrum and parallel to the axis of said needle, a presser-foot at a predetermined distance above said lever, a feed-dog directly below said lever, whereby the material to be worked upon may pass between said presser-foot and said lever, and then over said feed-dog, a spring pressing said presser-foot down upon said lever, means for automatically raising said presser-foot at each stroke of the needle and while the needle is raised, and a second spring pressing said lever down upon said feed-dog.

51. In a blindstitching sewing-machine, the combination of a vertically and longitudinally reciprocating vertical needle, a work-carrying lever with substantially a horizontal upper surface, and having the axis of its fulcrum horizontal, a head by which the needle is carried, and located directly over said lever, which extends from a point beyond said head to a point under said head, and a straight-edge roller on one side of said lever and having its axis in a plane which is perpendicular to the axis of said fulcrum and parallel to the axis of said needle, a presser-foot at a predetermined distance above said lever, a feed-dog directly below said lever, whereby the material to be worked upon may pass between said presser-foot and said lever, and then over said feed-dog, a spring pressing said presser-foot down upon said lever, means for automatically raising said presser-foot at each stroke of the needle and while the needle is raised, a second spring pressing said lever down upon said feed-dog, and a second roller larger than the first and parallel thereto and attached to said lever and adapted to press toward said feed-dog.

52. In a blindstitching sewing-machine, the combination of a vertically and longitudinally reciprocating vertical needle, a work-carrying lever with substantially a horizontal upper surface, and having the axis of its fulcrum horizontal, a head by which the needle is carried, and located directly over said lever, which extends from a point beyond said head to a point under said head, and a straight-edge roller on one side of said lever and having its axis in a plane which is perpendicular to the axis of said fulcrum and parallel to the axis of said needle, a presser-foot at a predetermined distance above said lever, a feed-dog directly below said lever, whereby the material to be worked upon may pass between said presser-foot and said lever, and then over said feed-dog, a spring pressing said presser-foot down upon said lever, means for automatically raising said presser-foot at each stroke of the needle and while the needle is raised, a second spring pressing said lever down upon said feed-dog, a second roller larger than the first and parallel thereto and attached to said lever and adapted to press toward said feed-dog, and bearings for said second roller attached to the under side of said lever.

53. In a blindstitching sewing-machine, the combination of a vertically and longitudinally reciprocating vertical needle, a work-carrying lever with a substantially horizontal upper surface, and having the axis of its fulcrum horizontal, a head by which the needle is carried, and located directly over said lever, which extends from a point beyond said head to a point under said head, and a straight-edge roller on one side of said lever and having its axis in a plane which is perpendicular to the axis of said fulcrum and parallel to the axis of said needle, a presser-foot at a predetermined distance above said lever, a feed-dog directly below said lever, whereby the material to be worked upon may pass between said presser-foot and said lever, and then over said feed-dog, a spring pressing said presser-foot down upon said lever, means for automatically raising said presser-foot at each stroke of the needle and while the needle is raised, a second spring pressing said lever down upon said feed-dog, a bed-plate for the machine, a support for said fulcrum, and means for moving said support horizontally to and from said needle.

54. In a blindstitching sewing-machine, the combination of a vertically and longitudinally reciprocating vertical needle, a work-carrying lever with substantially a horizontal upper surface, and having the axis of its fulcrum horizontal, a head by which the needle is carried, and located directly over said lever, which extends from a point beyond said head to a point under said head, and a straight-edge roller on one side of said lever and having its axis in a plane which is perpendicular to the axis of said fulcrum and parallel to the axis of said needle, a presser-foot at a predetermined distance above said lever, a feed-dog directly below said lever, whereby the material to be worked upon may pass between said presser-foot and said lever, and then over said feed-dog, a spring pressing said presser-foot down upon said lever, means for automatically raising said presser-foot at each stroke of the needle and while the needle is raised, a second spring pressing said lever down upon said feed-dog, a bed-plate for the machine, a support for said fulcrum, means for moving said support horizontally to and from said needle, and manual devices for fixing said support and for moving the same.

55. In a blindstitching sewing-machine, the combination of a vertically and longitudinally reciprocating vertical needle, a work-carrying lever with substantially a horizontal surface, and having the axis of its fulcrum horizontal, a head by which the needle is carried, and located directly over said lever, which extends from a point beyond said head to a point under said head, and a straight-edge roller on one side of said lever and having its axis in a plane which is perpendicular to the axis of said fulcrum and parallel to the axis of said needle, a presser-foot at a predetermined distance above said lever, a feed-dog directly below said lever, whereby the material to be worked upon may pass between said presser-foot and said lever, and then over said feed-dog, a spring pressing said presser-foot down upon said lever, means for automatically raising said presser-foot at each stroke of the needle and while the needle is raised, a second spring pressing said lever down upon said feed-dog, a driver for said machine for operating the above-named elements, and mechanism supported upon said head for giving a lateral throw to said needle and automatically controlled by said driver.

In testimony whereof I have hereunto subscribed my name and affixed my seal this 14th day of January, 1903.

CHARLES FRANCIS FILOR. [L. S.]

Witnesses:
MICHAEL J. SOLAN,
NEVIN J. LOOS.